H. W. Chamberlain
Clothes-Line Reel.
Nº 58,378.           Patented Oct. 2, 1866.
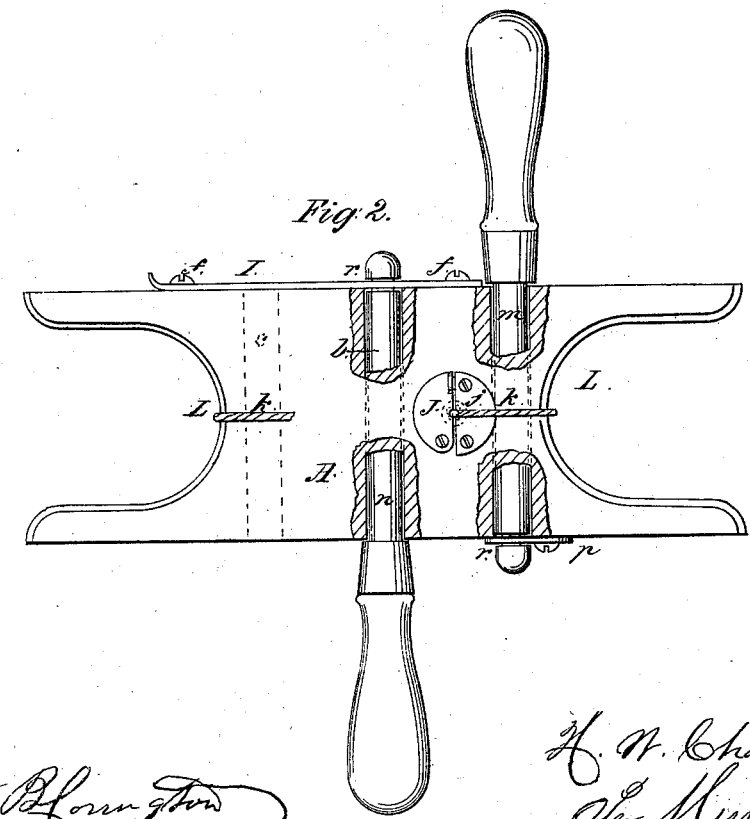
Witnesses:           Inventor:

UNITED STATES PATENT OFFICE.

H. W. CHAMBERLAIN, OF JERSEY CITY, NEW JERSEY.

IMPROVED CORD AND LINE REEL.

Specification forming part of Letters Patent No. 58,378, dated October 2, 1866.

*To all whom it may concern:*

Be it known that I, H. W. CHAMBERLAIN, of Jersey City, in the county of Hudson and State of New Jersey, have invented a new and Improved Cord and Line Reel; and I do hereby declare that the following is a full, clear, and exact description thereof, which will enable others skilled in the art to make and use the same, reference being had to the accompanying drawings, forming part of this specification, in which—

Figure 1 is an edge or side view of my improved cord-reel, and Fig. 2 is a top view of the same.

Similar letters of reference in the different figures indicate corresponding parts.

This invention relates to a new and improved cord-reel, which consists in a flat piece of wood, having deep and capacious notches cut in its ends for receiving the coil as it is wound on, and having handles so attached that the reel is operated with great facility and rapidity; and also in a novel mode of securing the handles in an adjustable manner; and also in a mode of securing the end of the cord to the reel, the whole making a very simple and efficient device for that purpose, as hereinafter fully set forth.

Having described the nature of my invention, I will proceed to describe its construction and operation.

A in the accompanying drawings is the reel, which is formed by cutting notches L L, Fig. 2, in the ends of a flat piece of wood, as shown, and then boring three holes through it, as shown by dotted lines in Fig. 2, and as shown by *a b c* in Fig. 1, the holes receiving the handles *n m*. When winding up the handle *n* is removed from the center hole, *b*, and placed in the end hole, *c*, and then both handles, *n* and *m*, act as cranks, and the fulcrum is an imaginary point between the two cranks; but the reel may be used for winding up when the cranks are in the position shown, in which case the center crank, *n*, is the fulcrum. In drawing the cord off of the reel, the reel is always held by a handle placed in the center hole, *b*, as shown by handle *n*, Fig. 2, and then the reel is balanced, and its motion is steady and even.

The handles are secured in place in an adjustable manner by slides I and P, Fig. 2.

The long slide I serves to secure the handle *n* in either of the holes *c* or *b*, and the short slide *p* secures the handle *m*. The slide I has holes *d d* cut through it, and on one side of each hole *d* is a slot or recess. The handle is first pushed through the hole *d*, and then the slide I is pushed endwise, sliding on the retaining-screws *f f*, so that the plate seizes the neck *r*, Fig. 2, of the handle, and it is thus secured in place. The action of the small slide *p* is the same.

The cord *k* is secured to the reel by a divided disk, J *j*, Fig. 2, one part of the disk, J, being pivoted at one side so that this part swings back. A knot is tied in the end of the cord, and then placed between the two halves of the disk, and the pivoted half, J, is then closed against the opposite half, *j*, and the knot is retained between them, and by this means the cord *k* is readily secured to the reel.

This reel may be used for thread and small cordage, such as fishing-lines, kite-lines, ships' log-lines, &c., or it may be used for heavier cords and ropes, and for articles such as tape, braid, &c.

Having thus described my invention, what I claim as new, and desire to secure by Letters Patent, is—

1. The reel A and two handles, *n m*, arranged and operating substantially in the manner and for the purpose set forth.

2. The adjusting or securing slides I and P, in combination with the reel A, for securing the handles in the reel, as and for the purpose set forth.

3. The combination of the cord clamp or holder J *j* with a reel, adapted to operate substantially as specified.

H. W. CHAMBERLAIN.

Witnesses:
M. M. LIVINGSTON,
ALEX. F. ROBERTS.